April 21, 1953   H. J. BUTLER   2,635,714
BRAKE WITH SELF-ALIGNING FRICTION SURFACES
Filed Nov. 19, 1949   3 Sheets-Sheet 1

INVENTOR
Henry James Butler
by Benj. T. Pauler
his attorney

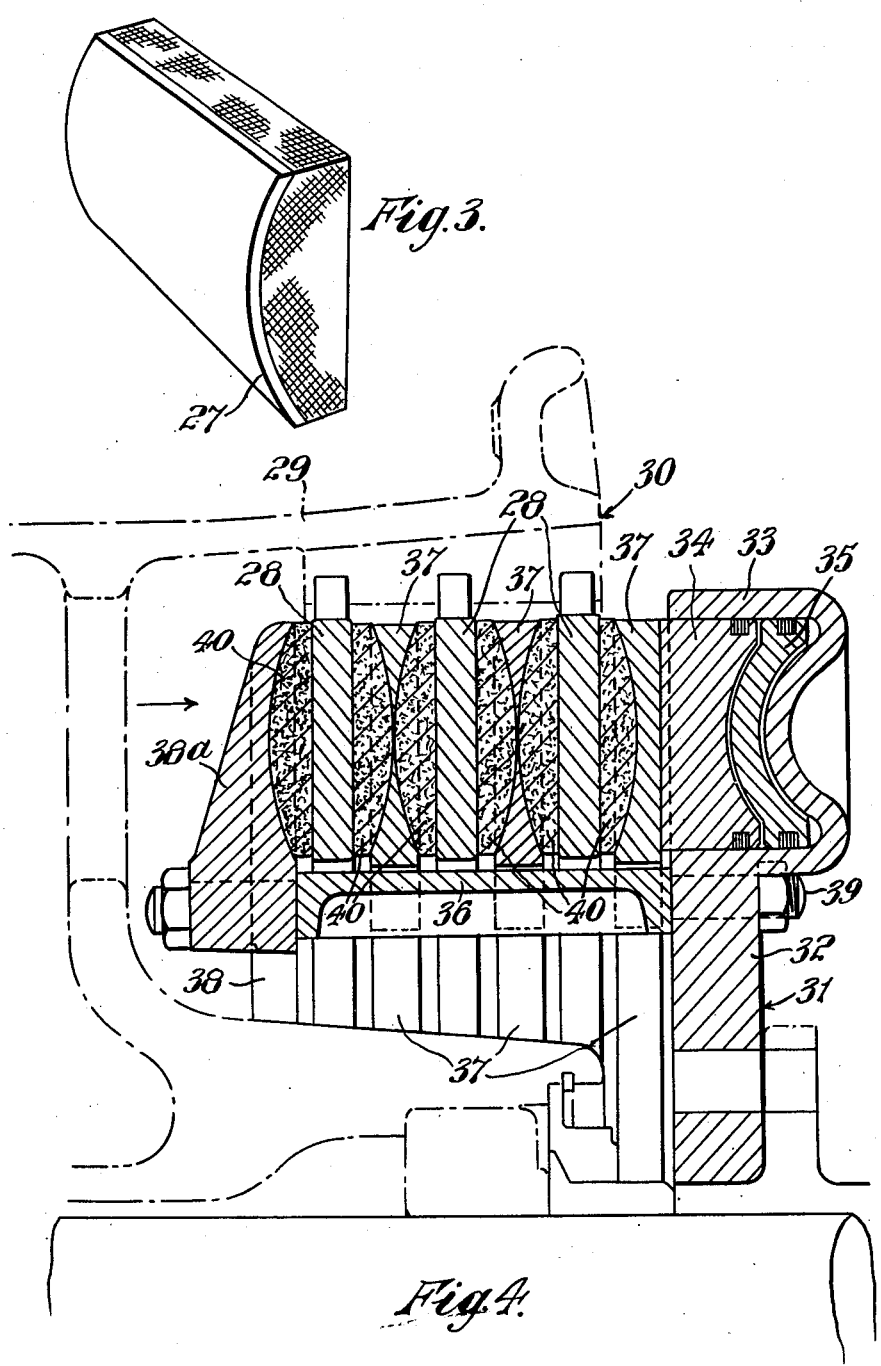

April 21, 1953  H. J. BUTLER  2,635,714
BRAKE WITH SELF-ALIGNING FRICTION SURFACES
Filed Nov. 19, 1949  3 Sheets-Sheet 3

Patented Apr. 21, 1953

2,635,714

UNITED STATES PATENT OFFICE 2,635,714

BRAKE WITH SELF-ALIGNING FRICTION SURFACES

Henry James Butler, Sutton Coldfield, England, assignor to Dunlop Rubber Company Limited, London County, England, a British company Application November 19, 1949, Serial No. 128,365
In Great Britain November 16, 1948

11 Claims. (Cl. 188—72)

This invention relates to brakes, and more particularly to disc brakes for aircraft.

Disc brakes of the type having one or a plurality of discs engaging with a rotatable part of the wheel and axially slidable relative to said wheel, friction pads adjacent both sides of said discs at one or a plurality of locations and secured to a non-rotatable part of the wheel, and a mechanism for forcing the friction pads into frictional contact with said discs are known. Also known are disc brake constructions incorporating one or more pairs of inner and outer discs.

Difficulties have arisen in these types of disc brake constructions regarding the uneven wearing of the friction pads. The uneven wear may be caused by the fact that the surface speed of a disc increases radially outwards and that the rate of wear on a pad varies with the speed. Another cause of uneven wear may be that the inner portions of the radial faces of a disc are less efficiently cooled than the outer portions and consequently run at a higher temperature than the outer parts of the disc. Yet another reason for uneven wear, in a disc brake of the concentric inner and outer type, may be that the inner and outer discs are relatively displaced in an axial direction which causes the carrier plates holding the friction pads and extending across the radial width of both discs to be inclined at a slight angle to both discs so that the braking pressure is not uniform over the whole of the disc.

Whatever the cause, the greatest wear normally takes place on that part of the friction pad adjacent one periphery of the disc, decreasing to the least wear on that part adjacent the other periphery of the disc. Thus frictional contact will be greater on one portion of the radial surface of the disc when the brakes are applied. This will materially reduce the efficiency of the brake and the friction pads will require frequent and costly renewals.

The object of this invention is to provide a disc brake having friction pads that apply a substantially uniform braking pressure over their whole braking surface even if their rate of wear is not uniform.

According to the invention a disc brake comprises a friction pad having a flat face adapted to frictionally engage a brake disc and a rounded under-surface, and an associated member having a rounded portion complementary to the rounded under-surface of the pad and forming a seating therefor, whereby the pad is rockable about said portion.

In order that the invention may be fully described, reference is made to the accompanying drawings, in which:

Fig. 3 is a perspective sketch of one embodiment of a friction pad.

Fig. 4 is a sectional elevation of part of a wheel incorporating another embodiment of the invention.

Figure 1:
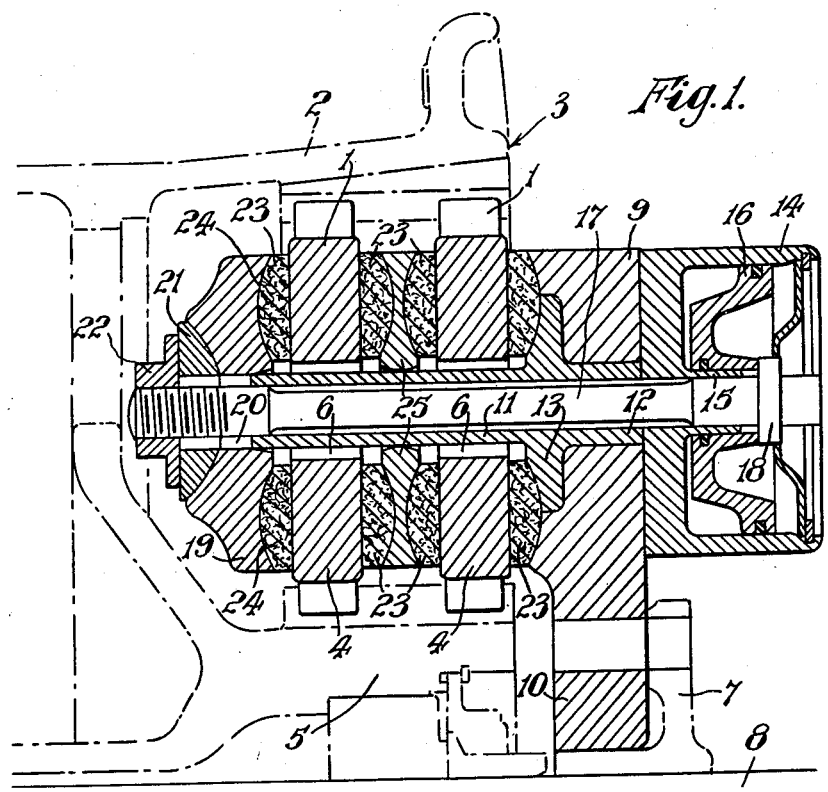
Fig. 1 shows a sectional elevation of part of a wheel incorporating a disc brake in accordance with the present invention.
Figure 2:
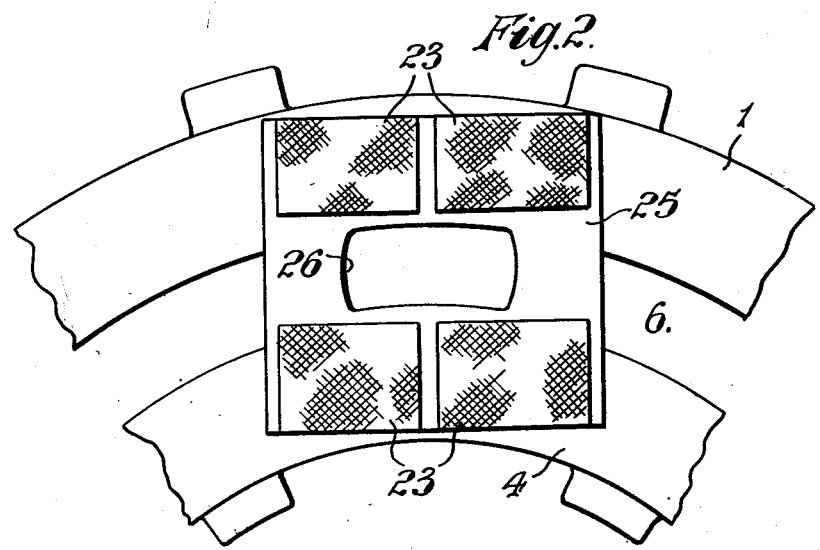
Fig. 2 is an elevation of a carrier plate, associated friction pads and part of the brake discs.

In the embodiments of the invention illustrated in Figures 1 to 3 a disc brake comprises four annular brake discs adapted to rotate with an associated wheel. The discs are arranged concentrically in pairs, the outer discs 1, Fig. 1, being keyed to the rim 2 of an associated wheel 3, and the inner discs 4 being keyed to the hub 5 of said wheel. An annular space 6 is provided between the inner periphery of the outer discs and the outer periphery of the inner discs, and the two sets of concentric discs are spaced axially apart from one another.

Secured to a non-rotatable annular flange 7 solid with the wheel axle 8 is a torque plate. Said torque plate comprises a square metal plate 9 having an annular flange 10 integral therewith provided with holes, and said flange 10 is secured to the flange 7 by nuts and bolts. The torque plate lies adjacent the side of the wheel housing the brake discs and extends radially to a location adjacent the rim. The squared portion of the torque plate is provided centrally with an axially extending hole and on the face of the plate adjacent the discs and concentric with said hole a rectangular recess is provided.

A hollow sleeve member 11 is provided at one end with a shank 12 and a rectangular flange 13 and said shank and flange fit tightly in the hole and recess respectively in the torque plate. The sleeve member 11, which is of substantially rectangular section with a circular hole extending axially therethrough, extends axially through the spaces 6 between the concentric discs to a location on the side of the discs remote from the torque plate.

On the face of the torque plate remote from the discs is secured an annular cylinder having an outer peripheral wall 14 and an inner peripheral wall 15. An annular dished piston 16 is slidably fitted in said cylinder, sealing rings being provided on its inner and outer peripheries. A pressure fluid connection (not illustrated) is adapted to lead from the cylinder to a source of fluid pressure.

An operating rod 17 extends through the hole in the sleeve member. One end is provided with a circular flange 18 which seats on one edge of the inner periphery of the annular piston. The other end of the rod extends beyond the end of the sleeve member and is threaded. A square pressure plate 19 is provided centrally with a substantially rectangular hole 20 slightly larger than the section of the sleeve member 11, and the end of the sleve member fits into one end of said hole, the larger sides of said hole being slightly bevelled at this location.

On the side of the pressure plate remote from the brake discs a part-spherical recess is centrally provided and a part-spherical seating member 21 of complementary section fits into said recess. The seating member is provided centrally with a hole of larger diameter than the end of the operating rod, and a nut 22 at the end of said operating rod and abutting the flat surface of the seating member holds the assembly together.

Two rectangular pads of friction material, in end to end relationship, are adapted to frictionally engage each of the radially extending sides of the four brake discs. A total of sixteen pads are thus provided, four associated with the pressure plate, four with the torque plate and eight associated with a carrier plate intermediate the two concentric sets of discs. Each friction pad 23 is rectangular and has a plane face adapted to frictionally contact a disc, and the face opposite said plane face is part-cylindrical, the longitudinal axes of said two faces being parallel.

The four pads associated with the pressure plate are accommodated in four rectangular recesses 24 of part-cylindrical section which are complementary to the part-cylindrical portions of the pads and which are located on that side of the plate adjacent the discs. The pads are arranged one in each corner of said pressure plate, the longitudinal axis of each pair of pads, i. e. those pads associated with the same friction face, being disposed on a line passing through the mid point of the axis of the discs. The four pads associated with the torque plate are similarly accommodated in rectangular recesses in the face of the torque plate remote from the cylinder.

The eight friction pads disposed between the concentric sets of discs are accommodated on a carrier plate 25 (Fig. 2) which is a square member having a central substantially rectangular hole 26 slightly larger than the section of the sleeve member and through which the sleeve member slidably projects. The longer sides of the hole 26 are bevelled on each side of the median plane of said plate. Each face of the carrier plate is provided with four recesses, as previously described, into which the pads are fitted. It will thus be seen that the friction pads are capable of "rocking" in their associated recesses, and said "rocking" movement takes place about an axis at right angles to the radius of the discs. Movement of the pads in a tangential or circumferential direction, e. g. when the brake is applied, is prevented by the ends of the pads abutting the ends of the recesses.

The brake is operated in a conventional manner by an increase in fluid pressure between the piston and the base of the cylinder, which, acting through the operating rod, pulls the pressure plate towards the torque plate. Hence the assembly of discs and friction pads is forced together in frictional contact. If differential wear takes place over the friction surface of a friction pad, said pad will "rock" in its seating until the flat friction surface is again co-planar with the face of its associated brake disc. Again, if, for reasons previously described, the carrier plate is inclined at an angle to the discs, the associated friction pads will substantially adjust themselves, thus ensuring that the maximum surface areas between pads and discs are in frictional contact.

The part-spherical ball seating between the pressure plate at the end of the operating rod allows the said pressure plate to pivot about the seating. Thus if the inner and outer discs are radially misaligned the pressure plate will pivot and equalize the pressure on said inner and outer discs. This construction is more specifically described in our co-pending application Ser. No. 243,291, filed August 22, 1951, and now abandoned.

To facilitate the "rocking" movement previously described the rounded under-surface of the pad may be provided with a metal backing 27, which may e. g. be bonded thereto. This construction is illustrated in perspective in Fig. 3. Alternatively the friction pad may be of rectangular section and have bonded thereto a metal member having one flat face and one face part-cylindrical.

As an alternative to this construction, the friction pads may be provided with part-cylindrical recesses on one of their faces and the torque plate, carrier plate and pressure plate provided with complementary part-cylindrical projections; the friction pads thus being rockable on said projections.

Whilst the brake has been described and illustrated as having only one fluid pressure operated mechanism and one set of friction pads, it is of course understood that more than one mechanism and sets of pads may be provided around the periphery of the discs.

In other disc brake constructions, instead of a plurality of concentric inner and outer discs being provided, only a single set of either inner or outer discs may be rotatably and slidably fitted to the wheels. Such a construction is shown in Fig. 4, which illustrates a brake having three annular, axially-aligned discs 28 keyed to the rim 29 of an associated wheel 30.

Three sets of piston and cylinder mechanisms and three sets of friction pads are provided, equispaced around the circumference of the discs. The torque plate 31 is non-rotatably secured to a part of the wheel, as in the previous construction, and has three radially extending arms 32, angularly equispaced and extending to a location adjacent the inner periphery of said discs. The end of each arm is formed integrally with a cylinder 33 having its open end presented towards the discs and axially in line therewith. Slidably fitting in each cylinder is a piston 34, having one end projecting slightly outside the cylinder, and a second piston 35, also slidably fitted in the cylinder abuts the first piston.

Secured to each arm of the torque plate is a rectangular platform 36, which extends axially into the wheel and is spaced adjacent the inner periphery of the discs. Each platform is circumferentially extending and the three platforms have a common radius, the edges of the platforms being radially-extending. Slidably fitted to said three platforms are three carrier plates 37. Each carrier plate is of similar shape to a backing plate 38, described below, and has a substantially triangular outline, the apices being truncated, and an inner diameter such that it is well clear of the hub of the wheel. The plates are mounted concentrically of the wheel, two of said plates lying intermediate the discs and the remaining plate lying between the piston and cylinder mechanisms and the disc adjacent to them, and abutting the end pistons of said mechanisms. The inner periphery of each plate is provided with three notches which register with said platform 36, the plates thus being axially slidable along said platforms, which prevent circumferential movement of said plates.

Figure 5:
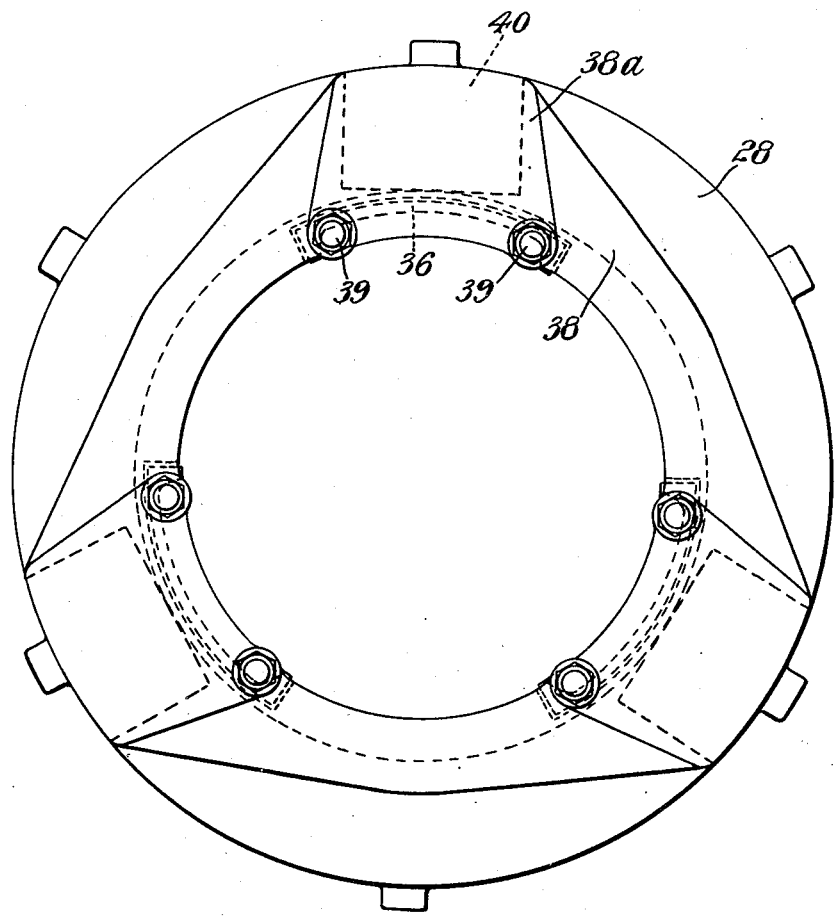
Fig. 5 is a view of the complete brake shown in part section in Fig. 4, looking in the direction of the arrow and omitting the wheel structure, torque plate and piston and cylinder mechanisms.

A backing plate 38 (Fig. 5) is secured rigidly to the ends of the platforms remote from the torque plate by bolts 39 which pass through said torque plate, platforms and backing plate. The backing plate is of generally similar outline to the carrier plates but it is provided with thickened portions 38a at its corners to give it added rigidity.

In all, eighteen pads of friction material 40, are provided to co-operate with the discs, and said pads are arranged in three axially-aligned sets of six in each set. The pads are similar to those described in the previous embodiment, and one pad of each set is adapted to frictionally engage a face of each disc. The pads are provided with a part-cylindrical under surface, and the backing plate and carrier plates also have part-cylindrical recesses into which the pads fit. The pads in this case extend substantially from the inner periphery of the discs to the outer and are rockable about an axis normal to the radius of the discs.

The cylinder is provided with two fluid pressure connections (not illustrated) to a source of fluid pressure one leading to a space between the two pistons and one leading to a space between the piston 35 and the end of the cylinder. The purpose and utility of the pistons 34 and 35 is that they form a part of a dual control mechanism which is provided so that should one control fail for any reason, an alternative braking control is immediately available with a minimum increase in the overall weight of the brake assembly. When fluid is admitted between the piston 35 and the end of the cylinder 33 from one source of fluid pressure, the piston 35 abuts the piston 34 and both move axially outwardly to force the friction pads and brake discs towards the fixed pressure plate, thus applying the brakes. However, when fluid is admitted between the piston 35 and the piston 34 from another source of fluid pressure the two pistons move in opposite directions. Piston 35 abuts the end of the cylinder 33 and piston 34 moves outwardly away from piston 35 to force the friction pads and brake discs towards the fixed pressure plate 38, thus applying the brakes as before. Circumferential movement of the pads is prevented by the ends of the pads abutting the ends of the recesses in the backing plates, and circumferential movement of the carrier plates is prevented by the three platforms which slidably engage with said plates.

If differential wear takes place over the face of any of the friction pads, said pads will rock in their seating, thus presenting a friction face substantially co-planar with the disc.

Whilst the brakes have been described and illustrated as being actuated by a fluid-pressure operated piston and cylinder mechanism, they may also be actuated by other types of fluid pressure operated mechanisms, e. g. bellows mechanisms or flexible expander bags.

Having described my invention what I claim is:

1. A disc brake comprising an annular, rotatable and axially slidable disc, a non-rotatable member on one side of said disc, a non-rotatable axially moveable member on the other side of said disc, each of said members having a part-cylindrical recess on the face adjacent the disc, friction pads having a part-cylindrical under surface rockably seating in each of said recesses and a plane braking face to frictionally engage said disc, and a mechanism to effect said engagement.

2. The disc brake of claim 1 in which the axis of said part-cylindrical surfaces of said recess and pad is transverse to a radius of the axis of rotation of said disc.

3. A brake plate having part-cylindrical recesses in a plane face thereof spaced about an axial center, the axes of said recesses being straight and transverse to a radius drawn from said axial center, and friction pads, one for each recess each having a plane outer face and a part-cylindrical convex face in contact with the surface of its respective recess.

4. The brake plate of claim 3 in which the plane outer faces of said pads are rectangular.

5. The brake plate of claim 3 in which said recesses and friction pads are positioned symmetrically about said axial center.

6. The brake plate of claim 3 in which a part-cylindrical backing is mounted on the part-cylindrical surfaces of said pads.

7. A brake comprising the brake plate of claim 3 and a brake disc totable on the axis of said plate.

8. A disc brake which comprises an assembly of axially spaced, co-axial, annular, rotatable and axially slidable discs, an axially movable carrier plate spaced between said discs and provided with a part-cylindrical recess on each face thereof, friction pads each having a plane braking face to frictionally engage the discs and a part-cylindrical under surface rockably seated in one of said recesses, a non-rotatable member located at one end of said assembly of discs, a non-rotatable, axially movable, member located adjacent the other end of said assembly of discs, each of said members having a part cylindrical recess on the face opposite the end of said assembly of discs, friction pads having a part-cylindrical under surface rockably seated in one of said recesses and a plane braking face to frictionally engage the end disc of said assembly, and a mechanism to effect engagement between the discs of said assembly and the friction pads.

9. A disc brake which comprises an assembly of axially spaced pairs of co-axial, annular, rotatable and axially slidable, inner and outer brake discs, the outer discs being spaced radially from the inner discs, an axially movable carrier plate spaced intermediate each adjacent pair of inner and outer discs, each plate being provided with part-cylindrical recesses on each face thereof and opposite each disc, friction pads each having a plane braking face to frictionally engage the discs and a part-cylindrical under surface rockably seated in one of said recesses, a non-rotatable member located adjacent to one end of said assembly, a non-rotatable, axially movable member located adjacent to the other end of said assembly, each of said members having part-cylindrical recesses on the face adjacent to the discs at their respective ends of the assembly, friction pads each having a part-cylindrical under surface rockably seating in one of said recesses and a plane braking face to frictionally engage a disc, and a fluid pressure mechanism secured to one of the members at one end of said assembly to effect engagement between the discs and the friction pads, said mechanism including an operating rod passing axially between the inner and outer discs of said axially spaced pairs of discs and having one end secured to the mechanism and the other end secured to the member at the opposite end of the assembly.

10. The disc brake of claim 9 in which the member at the end of the assembly remote from the fluid pressure mechanism is pivotally secured to the end of said operating rod.

11. A disc brake comprising an inner, annular, rotatable and axially slidable brake disc, an outer, annular, rotatable and axially slidable brake disc, spaced radially from said inner disc, a non-rotatable friction pad holding member on one side of said discs, a non-rotatable, axially movable, friction pad holding member on the other side of said discs, each of said friction pad holding members having part-cylindrical recesses on the face adjacent the discs, friction pads each having a part-cylindrical under surface rockably seating in one of said recesses and a plane braking face positioned to be brought into frictional engagement with said discs as one of said friction pad holding members is moved toward the other of said friction pad holding members, and a fluid pressure mechanism secured to one of said friction pad holding members on one side of said discs to move one of said members toward the other, said mechanism including an operating rod passing axially between said discs and having one end secured to one friction pad holding member on one side of said discs and the other end axially slidable in the friction pad holding member on the other side of said discs.

HENRY JAMES BUTLER.

References Cited in the file of this patent

UNITED STATES PATENTS

| Number | Name | Date |
|---|---|---|
| 53,846 | Mattison | Apr. 10, 1866 |
| 311,262 | Shaw | Jan. 27, 1885 |
| 489,023 | Miller | Jan. 3, 1893 |
| 538,722 | Biedermann | May 7, 1895 |
| 1,275,079 | Newbigin | Aug. 6, 1918 |
| 1,682,190 | Schein | Aug. 28, 1928 |
| 1,949,053 | Kutter | Feb. 27, 1934 |
| 2,351,041 | Hawley | June 13, 1944 |
| 2,366,093 | Forbes | Dec. 26, 1944 |

FOREIGN PATENTS

| Number | Country | Date |
|---|---|---|
| 97,566 | Austria | Mar. 15, 1924 |
| 442,336 | Great Britain | Feb. 5, 1936 |